US012600896B2

(12) United States Patent
Somerville et al.

(10) Patent No.: US 12,600,896 B2
(45) Date of Patent: Apr. 14, 2026

(54) LIGNIN-BASED COMPOSITIONS AND RELATED HYDROCARBON RECOVERY METHODS

(71) Applicant: LignoSol IP Limited, San Gwann (MT)

(72) Inventors: Desmond Alexander Somerville, San Gwann (MT); Patrick Dieter Waibel, San Gwann (MT)

(73) Assignee: LignoSol IP Limited, San Gwann (MT)

( * ) Notice: Subject to any disclaimer, the term of this patent is extended or adjusted under 35 U.S.C. 154(b) by 152 days.

(21) Appl. No.: 18/285,702

(22) PCT Filed: Apr. 5, 2022

(86) PCT No.: PCT/IB2022/053147
§ 371 (c)(1),
(2) Date: Oct. 5, 2023

(87) PCT Pub. No.: WO2022/214951
PCT Pub. Date: Oct. 13, 2022

(65) Prior Publication Data
US 2024/0199942 A1 Jun. 20, 2024

(30) Foreign Application Priority Data

Apr. 6, 2021 (GB) ..................................... 2104860
Nov. 8, 2021 (GB) ..................................... 2115987

(51) Int. Cl.
*C09K 8/582* (2006.01)
*C09K 8/588* (2006.01)

(52) U.S. Cl.
CPC .............. *C09K 8/582* (2013.01); *C09K 8/588* (2013.01); *C09K 2208/10* (2013.01)

(58) Field of Classification Search
None
See application file for complete search history.

(56) References Cited

U.S. PATENT DOCUMENTS

| | | |
|---|---|---|
| 3,438,895 A | 4/1969 | Edmonsond et al. |
| 3,864,276 A | 2/1975 | Benko et al. |
| (Continued) | | |

FOREIGN PATENT DOCUMENTS

| | | |
|---|---|---|
| CA | 1132452 A | 9/1982 |
| CA | 2425424 A1 | 4/2002 |
| (Continued) | | |

OTHER PUBLICATIONS

International Search Report for International Application No. PCT/IB22/59176, mailed Jan. 26, 2023 (3 pages).
(Continued)

*Primary Examiner* — Jeffrey D Washville
(74) *Attorney, Agent, or Firm* — Clark & Elbing LLP

(57) ABSTRACT

Compositions are provided for hydrocarbon recovery applications. In some embodiments, the composition comprises lignin, in particular technical lignin, and at least one strain of bacteria capable of biosurfactant production and/or a biosurfactant produced by at least one such isolated strain of bacteria. Also provided is a method for recovering hydrocarbon from a subterranean reservoir.

12 Claims, 2 Drawing Sheets

(56) References Cited

U.S. PATENT DOCUMENTS

| | | | |
|---|---|---|---|
| 4,101,394 A | 7/1978 | Johnson | |
| 4,133,385 A | 1/1979 | Kalfoglou | |
| 4,304,572 A | 12/1981 | Wiese et al. | |
| 4,392,941 A | 7/1983 | Roth et al. | |
| 4,877,517 A | 10/1989 | Bulatovic et al. | |
| 5,028,238 A | 7/1991 | von Rybinski et al. | |
| 5,059,332 A | 10/1991 | Satoh | |
| 5,114,597 A | 5/1992 | Rayborn et al. | |
| 5,164,480 A | 11/1992 | Huibers et al. | |
| 5,246,602 A | 9/1993 | Forrest | |
| 5,248,329 A | 9/1993 | Rusin et al. | |
| 5,316,664 A | 5/1994 | Gregoli et al. | |
| 5,316,682 A | 5/1994 | Keyser et al. | |
| 5,344,625 A | 9/1994 | Clough | |
| 5,368,972 A | 11/1994 | Yamashita et al. | |
| 5,711,383 A | 1/1998 | Terry et al. | |
| 5,743,945 A | 4/1998 | Yamashita et al. | |
| 5,911,276 A | 6/1999 | Kieke | |
| 6,306,800 B1 | 10/2001 | Samuel et al. | |
| 6,348,436 B1 | 2/2002 | Langlois et al. | |
| 8,450,260 B2 | 5/2013 | Crawford et al. | |
| 8,455,226 B2 | 6/2013 | De Windt et al. | |
| 8,741,256 B1 | 6/2014 | Harrison | |
| 8,748,153 B2 | 6/2014 | Tadic et al. | |
| 10,362,786 B2 | 7/2019 | Chen et al. | |
| 10,829,833 B2 | 11/2020 | Gos et al. | |
| 12,275,894 B2 | 4/2025 | Somerville et al. | |
| 2002/0044887 A1 | 4/2002 | Jones | |
| 2006/0177661 A1 | 8/2006 | Smith et al. | |
| 2007/0045198 A1 | 3/2007 | Sugiura | |
| 2009/0011972 A1 | 1/2009 | Suzuki et al. | |
| 2009/0082227 A1 | 3/2009 | Hnatow et al. | |
| 2009/0211960 A1 | 8/2009 | Nilsen et al. | |
| 2009/0266541 A1 | 10/2009 | Reynolds et al. | |
| 2009/0291861 A1 | 11/2009 | Sawdon | |
| 2009/0308612 A1 | 12/2009 | Weaver et al. | |
| 2010/0137168 A1 | 6/2010 | Quintero et al. | |
| 2010/0233050 A1 | 9/2010 | Gargulak et al. | |
| 2012/0247763 A1 | 10/2012 | Rakitsky et al. | |
| 2013/0274150 A1 | 10/2013 | Holt et al. | |
| 2014/0261077 A1 | 9/2014 | Merck et al. | |
| 2014/0371071 A1 | 12/2014 | Nitsche | |
| 2015/0166836 A1 | 6/2015 | Liu et al. | |
| 2015/0285051 A1 | 10/2015 | Miller et al. | |
| 2016/0168272 A1 | 6/2016 | Retsina et al. | |
| 2016/0236158 A1 | 8/2016 | Bauer | |
| 2017/0029691 A1 | 2/2017 | Faust, Jr. et al. | |
| 2017/0306264 A1 | 10/2017 | Peggau et al. | |
| 2018/0148632 A1 | 5/2018 | Bennett et al. | |
| 2018/0265794 A1 | 9/2018 | Dahlstrand et al. | |
| 2018/0355446 A1 | 12/2018 | Medoff et al. | |
| 2019/0031945 A1 | 1/2019 | Guo et al. | |
| 2019/0055459 A1 | 2/2019 | Zelenev et al. | |
| 2019/0093463 A1 | 3/2019 | Hardin et al. | |
| 2019/0184350 A1 | 6/2019 | Terasaka et al. | |
| 2019/0382649 A1 | 12/2019 | Jiang et al. | |
| 2019/0390405 A1 | 12/2019 | Geigle et al. | |
| 2020/0032128 A1 | 1/2020 | Farmer et al. | |
| 2020/0157408 A1 | 5/2020 | Farmer et al. | |
| 2020/0172788 A1* | 6/2020 | Farmer | E21B 43/16 |
| 2020/0255466 A1 | 8/2020 | Lintinen et al. | |
| 2020/0352016 A1 | 11/2020 | Bohdy | |
| 2021/0261451 A1 | 8/2021 | Patton | |
| 2021/0261459 A1 | 8/2021 | Alibek et al. | |

FOREIGN PATENT DOCUMENTS

| | | | | |
|---|---|---|---|---|
| CA | 2535702 A1 | 3/2005 | | |
| CA | 2547100 A1 | 11/2006 | | |
| CA | 2640005 A1 | 8/2007 | | |
| CA | 2661202 C | 11/2011 | | |
| CA | 2723591 C | 7/2013 | | |
| CA | 2705147 C | 9/2014 | | |
| CA | 2921996 A1 | 3/2015 | | |
| CA | 2693008 C | 4/2016 | | |
| CA | 2988826 A1 | 12/2016 | | |
| CA | 2791256 C | 6/2017 | | |
| CA | 3048404 A1 | 7/2018 | | |
| CA | 3052048 A1 | 8/2018 | | |
| CA | 3052465 A1 | 8/2018 | | |
| CA | 3054686 A1 | 9/2018 | | |
| CA | 3058761 A1 | 10/2018 | | |
| CA | 2999599 C | 12/2019 | | |
| CA | 2772395 C | 1/2020 | | |
| CA | 2720739 C | 4/2020 | | |
| CA | 2950089 C | 4/2020 | | |
| CA | 2831902 C | 5/2020 | | |
| CA | 2877367 C | 12/2020 | | |
| CA | 2945194 C | 7/2022 | | |
| CA | 2886934 C | 1/2023 | | |
| CN | 85105225 A | 7/1986 | | |
| CN | 101104177 A | 1/2008 | | |
| CN | 104152129 A | 11/2014 | | |
| CN | 104321422 A | 1/2015 | | |
| CN | 103636599 B | 3/2015 | | |
| CN | 205527917 U | 8/2016 | | |
| CN | 106188857 A | 12/2016 | | |
| CN | 108441223 A | 8/2018 | | |
| CN | 106217826 B | 9/2018 | | |
| CN | 108623112 A | 10/2018 | | |
| CN | 109943299 A | 6/2019 | | |
| CN | 110616062 A | 12/2019 | | |
| GB | 2514202 A | 11/2014 | | |
| GB | 2605591 A | * 10/2022 | | C07G 1/00 |
| JP | 2011-121002 A | 6/2011 | | |
| JP | 2017029892 A | 2/2017 | | |
| KR | 101711607 B1 | 3/2017 | | |
| KR | 10-2018-0130070 A | 12/2018 | | |
| RU | 2188935 C1 | 9/2002 | | |
| WO | WO-1992/19349 A1 | 11/1992 | | |
| WO | WO-2005/028592 A1 | 3/2005 | | |
| WO | WO-2012/151524 A2 | 11/2012 | | |
| WO | WO-2013/037643 A1 | 3/2013 | | |
| WO | WO-2015/065981 A1 | 5/2015 | | |
| WO | WO-2016/053345 A1 | 4/2016 | | |
| WO | WO-2016/196680 A1 | 12/2016 | | |
| WO | WO-2018/064689 A1 | 4/2018 | | |
| WO | WO-2019/067356 A1 | 4/2019 | | |
| WO | WO-2019/112970 A1 | 6/2019 | | |
| WO | WO-2019/191296 A1 | 10/2019 | | |
| WO | WO-2019/213055 A1 | 11/2019 | | |
| WO | WO-2020/028253 A1 | 2/2020 | | |
| WO | WO-2020/060529 A1 | 3/2020 | | |
| WO | WO-2020/072735 A1 | 4/2020 | | |
| WO | WO-2020/149756 A2 | 7/2020 | | |
| WO | WO-2020/264073 A1 | 12/2020 | | |
| WO | WO-2021/015633 A1 | 1/2021 | | |
| WO | WO-2021/052939 A1 | 3/2021 | | |

OTHER PUBLICATIONS

Nazari et al., "Study relationships between flotation variables and recovery of coarse particles in the absence and presence of nanobubble," Colloids and Surfaces A: Physicochemical and Engineering Aspects 559:284-8 (Sep. 27, 2018).

Search and Examination Report for Application No. GB2116007.2, dated Nov. 25, 2021 (8 pages).

Written Opinion for International Application No. PCT/IB22/59176, mailed Jan. 26, 2023 (6 pages).

Beisl et al., "Lignin from Micro- to Nanosize: Production Methods." Int. Journal of Molecular Sciences. 18(6): 1244 (Jun. 10, 2017) (31 pages).

Bicca et al., "Production of Biosurfactant by Hydrocarbon Degrading Rhodococcus Ruber and Rhodococcus Erythropolis." Revista de Microbiologia. 30: 231-236 (1999) (6 pages).

Chang et al., "A novel nano-lignin-based amphoteric copolymer as fluid-loss reducer in water-based drilling fluids." Colloids and Surfaces A. 583:123979 (Sep. 21, 2019) (10 pages).

Hruzová et al., "Organosolv lignin hydrophobic micro- and nanoparticles as a low-carbon footprint biodegradable flotation collector in mineral flotation." Bioresource Technology. 306:123235 (Mar. 23, 2020) (4 pages).

(56) References Cited

OTHER PUBLICATIONS

International Search Report and Written Opinion for International Application No. PCT/IB22/53145 mailed Jun. 27, 2022 (9 pages).
International Search Report and Written Opinion for International Application No. PCT/IB22/53147 mailed Jun. 15, 2022 (9 pages).
International Search Report and Written Opinion for International Application No. PCT/IB22/53148 mailed Jun. 27, 2022 (9 pages).
International Search Report and Written Opinion for International Application No. PCT/IB22/53151 mailed Jun. 29, 2022 (9 pages).
International Search Report and Written Opinion for International Application No. PCT/IB22/53158 mailed Jun. 21, 2022 (8 pages).
International Search Report and Written Opinion for International Application No. PCT/IB22/53160 mailed Jun. 29, 2022 (7 pages).
International Search Report and Written Opinion for International Application No. PCT/IB22/53161 mailed Jun. 27, 2022 (6 pages).
International Search Report and Written Opinion for International Application No. PCT/IB22/53162 mailed Jul. 1, 2022 (7 pages).
Li, Qingxin, "Rhamnolipid synthesis and production with diverse resources." Front. Chem. Sci. Eng. 11(1): 27-36 (Mar. 22, 2017) (10 pages).
Negi et al., "A review on lignin utilization in petroleum exploration, petroleum products formulation, bio-fuel production, and oil spill clean-up." Biomass Conversion and Biorefinery. 13: 1417-1428 (Nov. 5, 2020) (12 pages).
Sauki et al., "Extracted Lignin from Rhizophora's Black Liquor as Fluid Loss Control Additive in Water Based Drilling Mud." Key Engineering Materials. 755: 74-80 (Aug. 20, 2018) (8 pages).
Schneider et al., "Assessment of Morphological, Physical, Thermal, and Thermal Conductivity Properties of Polypropylene/ Lignosulfonate Blends." Materials. 14(3): 543 (Jan. 23, 2021) (10 pages).

Search and Examination Report for Application No. GB2104859.0, dated May 11, 2021 (8 pages).
Search and Examination Report for Application No. GB2104860.8, dated May 4, 2021 (8 pages).
Search and Examination Report for Application No. GB2104862.4, dated May 21, 2021 (8 pages).
Search and Examination Report for Application No. GB2104865.7, dated Jun. 8, 2021 (8 pages).
Search and Examination Report for Application No. GB2104869.9, dated Apr. 16, 2021 (6 pages).
Search and Examination Report for Application No. GB2104870.7, dated Jun. 2, 2021 (7 pages).
Search and Examination Report for Application No. GB2104877.2, dated May 10, 2021 (6 pages).
Search and Examination Report for Application No. GB2104883.0, dated May 4, 2021 (8 pages).
Search and Examination Report for Application No. GB2115987.6, dated Dec. 15, 2021 (6 pages).
Solihat et al., "Lignin as an Active Biomaterial: A Review." Jurnal Sylva Lestari. 9(1): 1-22 (Jan. 2021) (22 pages).
Madhu, "Difference Between Anolyte and Catholyte", published Online Sep. 19, 2020 at: https://www.differencebetween.com/difference-between-anolyte-and-catholyte/ (3 pages).
Schneider et al., "Assessment of Morphological, Physical, Thermal, and Thermal Conductivity Properties of Polypropylene/ Lignosulfonate Blends", Materials, (Jan. 2021) vol. 14; 543 (10 pages).
This vs. That: Anolyte vs. Catholyte, published Online at: https://thisvsthat.io/anolyte-vs-catholyte (2023) (2 pages).

* cited by examiner

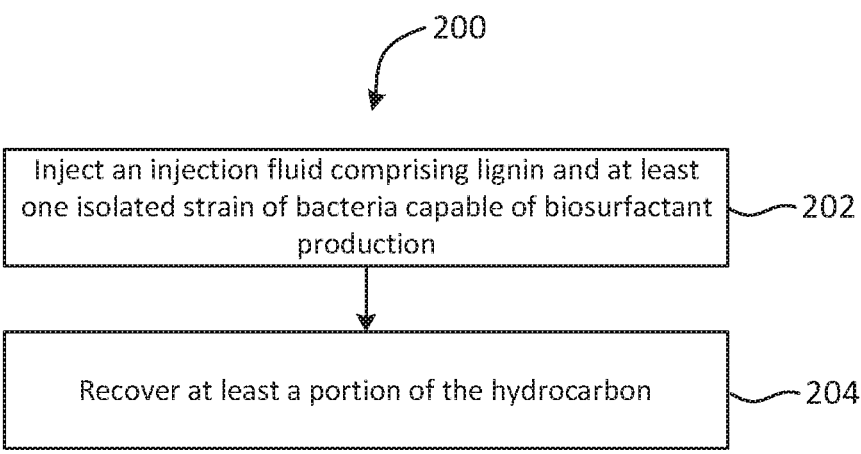

┌─────────────────────────────────────────────┐
│ Inject an injection fluid comprising lignin and at least │
│ one isolated strain of bacteria capable of biosurfactant │ ~202
│                    production                │
└─────────────────────────────────────────────┘
                        │
                        ▼
┌─────────────────────────────────────────────┐
│   Recover at least a portion of the hydrocarbon   │ ~204
└─────────────────────────────────────────────┘

Fig. 2

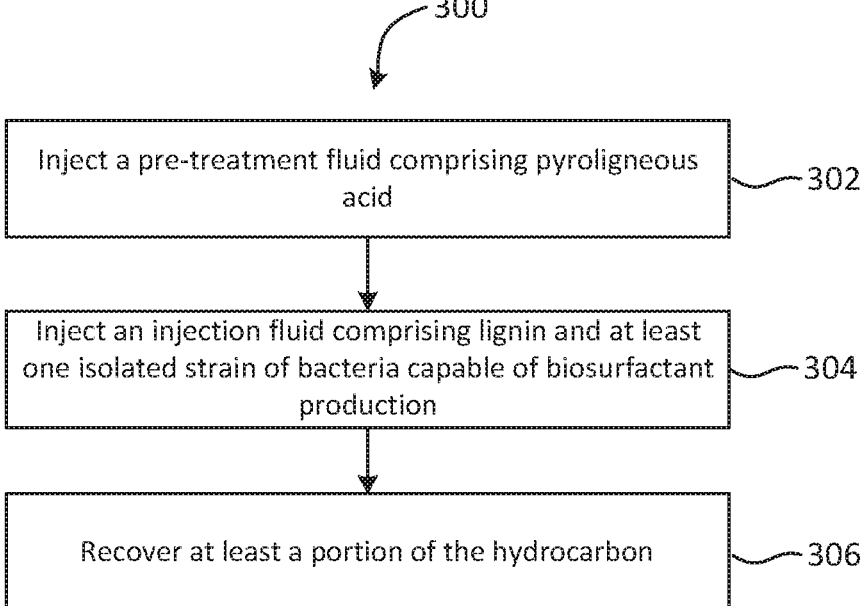

┌─────────────────────────────────────────────┐
│ Inject a pre-treatment fluid comprising pyroligneous │ ~302
│                      acid                    │
└─────────────────────────────────────────────┘
                        │
                        ▼
┌─────────────────────────────────────────────┐
│ Inject an injection fluid comprising lignin and at least │
│ one isolated strain of bacteria capable of biosurfactant │ ~304
│                    production                │
└─────────────────────────────────────────────┘
                        │
                        ▼
┌─────────────────────────────────────────────┐
│   Recover at least a portion of the hydrocarbon   │ ~306
└─────────────────────────────────────────────┘

Fig. 3

LIGNIN-BASED COMPOSITIONS AND RELATED HYDROCARBON RECOVERY METHODS

CROSS-REFERENCE TO RELATED APPLICATIONS

This application claims priority to GB Provisional Patent Application No. 2104860.8, filed 6 Apr. 2021, and GB Provisional Patent Application No. 2115987.6, filed 8 Nov. 2021, the disclosures of which are hereby incorporated by reference in their entireties.

BACKGROUND OF THE INVENTION

The present disclosure relates to the recovery of hydro-carbons from, for example, subterranean reservoirs. More particularly, the present disclosure relates to lignin-based compositions for hydrocarbon recovery applications and related methods. Hydrocarbons, including natural gas and oil (petroleum), may be extracted from subterranean reservoirs by a variety of means. In conventional reservoirs, the hydrocarbon is present in discrete accumulations or pools from which the hydrocarbons can readily be extracted via vertical wells drilled into the reservoir. In contrast, uncon-ventional reservoirs typically have low permeability and/or porosity and thus require specialized techniques to extract the hydrocarbons therein.

SUMMARY OF THE INVENTION

In one aspect of the invention, there is provided a method for recovering hydrocarbons from a hydrocarbon source, the method comprising:

providing a composition comprising lignin and at least one isolated strain of bacteria capable of producing at least one biosurfactant, and/or at least one biosurfactant produced from at least one bacteria capable of produc-ing a biosurfactant, the composition having a solids content of about 50% or above, in particular of about 50% to about 60%;

contacting the hydrocarbon source with the composition; and recovering at least a portion of the contacted hydrocar-bons.

In some embodiments the hydrocarbon source is a sub-terranean reservoir, having an injection well and a produc-tion well installed therein, the method comprising injecting the composition into the reservoir via the injection well, and recovering at least a portion of the hydrocarbons via the production well.

In some embodiments, the method further comprises injecting a pre-treatment fluid comprising at least 50% pyroligneous acid into the hydrocarbon source or reservoir, typically via the injection well, prior to contacting the hydrocarbon source or reservoir with the composition.

In another aspect of the invention, there is provided a hydrocarbon recovery composition suitable for recovering hydrocarbons from a source of hydrocarbons, in particular a subterranean reservoir, the composition comprising lignin, in particular technical lignin, and at least one isolated strain of bacteria capable of producing at least one biosurfactant, and/or at least one biosurfactant produced from at least one isolated strain of bacteria capable of producing a biosurfac-tant, the composition having a solids content of about 50% or above, in particular of about 50% to about 60%.

In some embodiments, the hydrocarbon recovery compo-sition further comprises a catholyte solution.

In some embodiments, the catholyte solution is a stabi-lized or upgraded catholyte solution.

The invention extends to the use of lignin, in particular technical lignin, in the recovery of hydrocarbons from a hydrocarbon-containing material.

Other aspects and features of the present invention will become apparent, to those ordinarily skilled in the art, upon review of the following description of specific embodiments of the disclosure.

BRIEF DESCRIPTION OF THE DRAWINGS

The invention will now be described in more detail, by way of example only, with reference to the accompanying drawings in which:

FIG. 2 is a flowchart of an example method for recovering hydrocarbons from a subterranean reservoir, according to some embodiments;

FIG. 3 is a flowchart of another example method for recovering hydrocarbons from a subterranean reservoir, according to some embodiments.

DESCRIPTION OF PREFERRED EMBODIMENTS

Figure 1:
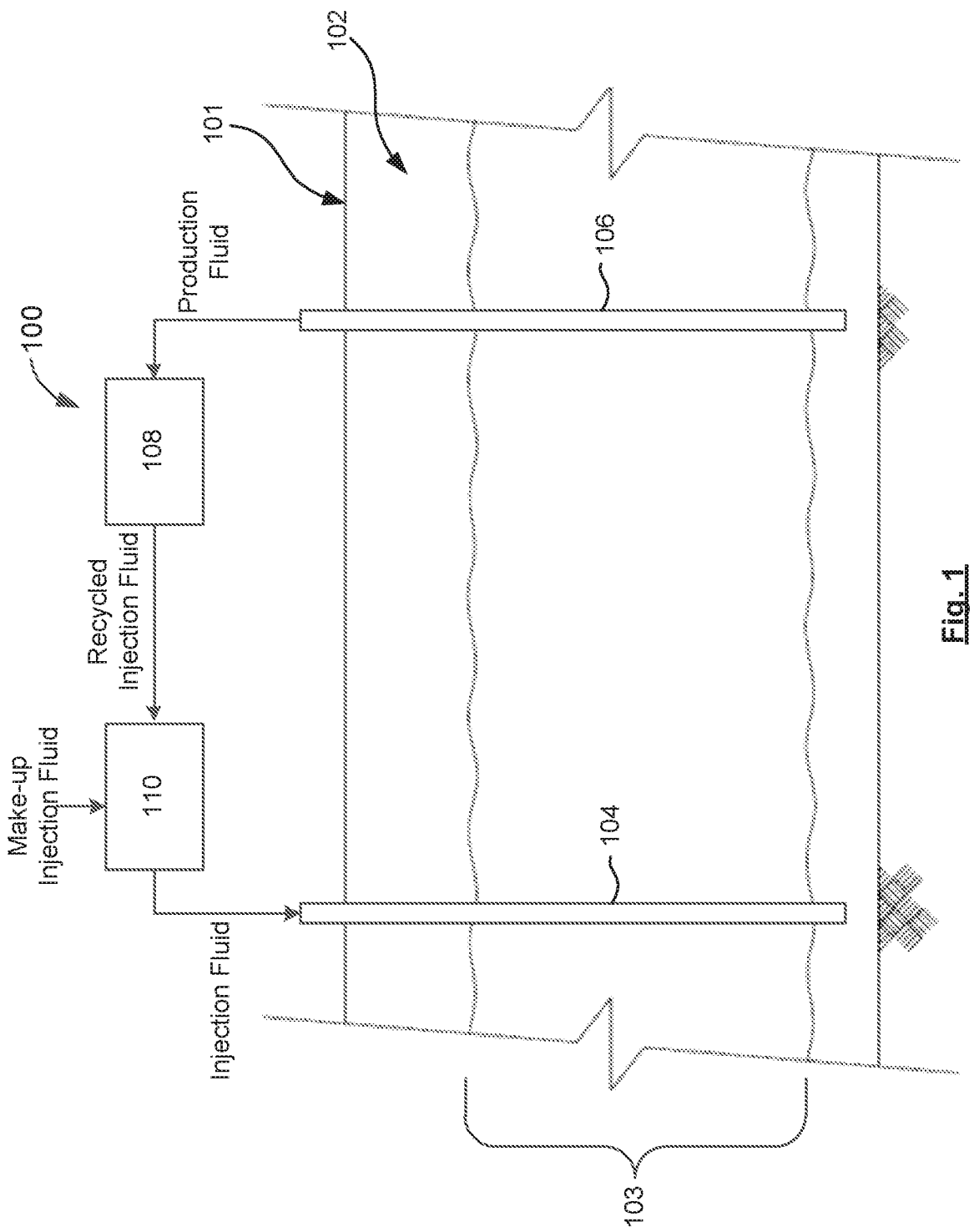
FIG. 1 is a side view diagram of an example system that may implement one or more embodiments of the methods for recovering hydrocarbon from a subterranean reservoir disclosed herein.

The hydrocarbon recovery compositions of the invention, in particular lignin-based hydrocarbon recovery composi-tions, are provided for hydrocarbon recovery applications, in particular for recovering hydrocarbons from a source of hydrocarbons, such as a subterranean reservoir, for example.

The method may be used for enhanced oil recovery (EOR). As used herein, "enhanced oil recovery" (also known as "tertiary recovery) refers to extraction of crude oil from a reservoir under circumstances where it is difficult or unfeasible to extract the oil using any other oil recovery techniques. EOR may be used to further extract oil from a reservoir following primary and/or secondary recovery. As used herein, "primary recovery" refers to a process for extracting oil using the natural energy of the reservoir, without application of external energy. Primary recovery may involve using the natural rise of the hydrocarbons to the surface of the earth or using artificial lift devices, such as pump jacks. For viscous oil reservoirs, CHOPS (cold heavy oil production with sand) is also considered a primary recovery process. As used herein, "secondary recovery" refers to a process for extracting oil in which an external fluid is injected into the reservoir to maintain the reservoir pressure. The external fluid is typically water or a gas. Alternatively, EOR may be used as the first or sole means of oil recovery, for example, in viscous oil reservoirs.

The methods described herein may be used in combina-tion with one or more other EOR methods or as an alterna-tive to such methods. Non-limiting examples of EOR meth-ods include: steam flooding; fire flooding; polymer flooding; gas injection methods including injection of $CO_2$, nitrogen, and/or carbon dioxide; as well as viscous oil recovery methods such as cyclic steam stimulation (CSS), steam-assisted gravity drainage (SAGD), cyclic steam circulation (CSC), vapor extraction (VAPEX), combustion assisted gravity drainage (CAGD), and toe to heel air injection (THAI).

In other embodiments, the methods may be used in combination with one or more primary or secondary recovery methods (or as an alternative to such methods). For example, the methods may be used in combination with CHOPS or water flooding.

As discussed above, a reservoir is a subterranean region that includes at least one pool or deposit of hydrocarbons therein. A portion of the reservoir that contains hydrocarbons therein may be referred to as a "pay interval" or "pay zone".

EOR methods typically involve injection of an injection fluid into the pay interval to promote the flow of oil to a production well from which the oil may be produced to surface. For example, in SAGD, the injection fluid comprises steam which heats the viscous oil in the reservoir to reduce its viscosity such that mobilized oil flows to the production well under the force of gravity. As another example, in polymer flooding techniques, the injection fluid comprises a polymer solution that increases the viscosity of water to "push" the oil towards the production well.

EOR methods may be implemented using a variety of different well configurations. In some embodiments, the well configuration comprises at least one injection well and at least one production well. The injection well is used to inject the injection fluid into the reservoir and the production well is used to collect the oil and convey a production fluid to the surface. As used herein, "production fluid" refers to the fluid produced from the production well which may include oil, at least a portion of the injection fluid, and any other fluids flowing into the injection well from the reservoir, for example, a portion of the native water in the reservoir.

In some embodiments, one or both of the injection well and the production well are vertical wells. As used herein, a "vertical" well refers to a well that extends substantially directly downward from the surface of the reservoir into the target pay interval. In some embodiments, one or both of the injection well and the production well are horizontal wells. As used herein, a "horizontal" well refers to a well having a vertical section that extends downward into the pay interval followed by a horizontal section that extends approximately parallel to the bottom of the pay interval. In other embodiments, a single well (vertical or horizontal) may function as both the injection well and the production well.

As used herein, "lignin" refers to a biopolymer that is found in the secondary cell wall of plants and some algae. Lignin is a complex cross-linked phenolic polymer with high heterogeneity. Typical sources for the lignin include, but are not limited to, softwood, hardwood, and herbaceous plants such as corn stover, bagasse, grass, and straw, for example.

In some embodiments, the lignin comprises technical lignin. As used herein, "technical lignin" refers to lignin that has been isolated from lignocellulosic biomass, for example, as a byproduct of a pulp and paper production or a lignocellulosic biorefinery. Technical lignins may have a modified structure compared to native lignin and may contain impurities depending on the extraction process. In some embodiments, the technical lignin comprises at least one of Kraft lignin, lignosulfonates, soda lignin, organosolv lignin, steam-explosion lignin, and enzymatic hydrolysis lignin. In other embodiments, the technical lignin may comprise any other form of technical lignin.

In embodiments where the lignin comprises lignosulfonates, the lignosulfonates may be in the form of a salt including, for example, sodium lignosulfonate, calcium lignosulfonate, or ammonium lignosulfonate.

In other embodiments, the technical lignin is in the form of unhydrolyzed Kraft black liquor. Black liquor is a byproduct of the Kraft process and may contain not only lignin but hemicellulose, inorganic chemicals used in the pulping process, and other impurities. In other embodiments, the technical lignin is in the form of "brown liquor" (also referred to as red liquor, thick liquor and sulfite liquor) which refers to the spent liquor of the sulfite process. In other embodiments, the technical lignin may be in the form of any other spent cooking liquor of a pulping process or any other suitable lignin-based byproduct.

In other embodiments, the lignin may be synthetic lignin or any other suitable type of lignin.

In some embodiments, the lignin is hydrolyzed. As used herein, "hydrolyze" refers to using acid or base hydrolysis to at least partially separate lignin from the polysaccharide content of the lignocellulosic biomass. For example, where the lignin is in the form of black liquor, carbon dioxide may be used to precipitate Kraft lignin from the black liquor and then the Kraft lignin may be neutralized with sodium hydroxide.

In some embodiments, the lignin is in aqueous suspension. As used herein, an "aqueous suspension" of lignin refers to solid particles of lignin suspended, dispersed, and/or dissolved in a solvent that at least partially comprises water. In some embodiments, the solvent comprises substantially all water. In other embodiments, the solvent may comprise a combination of water and any other suitable solvent.

In some embodiments, the aqueous suspension of lignin may have a solids content of about 10% to about 90%, or about 25% to about 75%, or about 30% to about 60%, or about 33% to about 55%. In some embodiments, the aqueous suspension of lignin may have a solids content of about 50% to about 60%. In some embodiments, the aqueous suspension of lignin may have a solids content of about 10% or above, or of about 25% or above, or of about 30% or above, or of about 33% or above or of about 50% or above. In some embodiments, the aqueous suspension of lignin may have a solids content of about 90% or below, or of about 75% or below, or of about 60% or below, or of about 55% or below. In some embodiments, the aqueous suspension has a solids content of about 46%. A solids content of about 33% to about 55% may allow the composition to be flowable, which may be preferred for some applications. In other applications, the composition may be used as a slurry and the solids content may be as high as about 85% to about 90%.

In some embodiments, the lignin comprises at least one of lignin nanoparticles and lignin microparticles. As used herein, "nanoparticle" refers to a particle in the nanometer size range, for example, between about 1 nm and about 100 nm, and "microparticle" refers to a particle in the micrometer size range, for example, between about 100 nm and about 1000 μm (1 mm). In some preferred embodiments, the lignin particles have a size of about 200 nm or less, or about 100 nm or less. In some preferred embodiments, at least about 20%, or at least 30%, or at least 40%, or at least 50%, or at least 60%, or at least 70%, or at least 80%, or at least 90% of the lignin particles are nanoparticles having a size of about 100 nm or less.

The lignin nanoparticles and/or microparticles can be produced by any suitable method. For example, the lignin nanoparticles and/or microparticles can be produced using at least one of: solvent shifting; pH shifting; cross-linking polymerization; mechanical treatment; ice-segregation; template based synthesis; aerosol processing; electro spinning; and carbon dioxide (CO$_2$) antisolvent treatment. Such methods are described in Beisl et al. "Lignin from Micro- to Nanosize: Production Methods" *Int. J. Mol. Sci.* 2017; 18: 1244, incorporated herein by reference in its entirety.

In some preferred embodiments, lignin nanoparticles are produced using a pH shifting method, for example, as disclosed in Beisl et al. Briefly, the starting lignin material may be dissolved in a basic solution (e.g. an aqueous NaOH solution at pH 12) and the pH of the solution may be gradually decreased by addition of acid (e.g. HNO$_3$) to precipitate lignin nanoparticles. The solution may then be neutralized (e.g. by addition of NaOH) to resuspend the nanoparticles. The resulting particles may have a size of about 200 nm or less, or about 100 nm or less. In other embodiments, the lignin nanoparticles may be produced by any other suitable method.

By providing the lignin in the form of lignin nanoparticles and/or microparticles, the surface area of the lignin is increased, thereby also increasing the negative force around each particle. In addition, lignin nanoparticles and/or microparticles may have improved solubility in water. Conventional lignins are typically only soluble in water at alkaline pH; however, nanoparticles and/or microparticles may be soluble in approximately neutral water (Beisl et al.), which may be preferred for some applications.

In some embodiments, where the lignin comprises an aqueous suspension of lignin nanoparticles, the zeta potential value of the suspension may be about –5 to about –80 mV. In some embodiments, the specific gravity of the aqueous suspension of lignin nanoparticles is between about 1.286 to about 1.7 SG.

The composition further comprises at least one isolated strain of bacteria capable of biosurfactant production and/or at least one biosurfactant produced from at least one isolated strain of bacteria capable of producing a biosurfactant.

As used herein, "isolated" or "isolate", when used in reference to a strain of bacteria, refers to bacteria that have been separated from their natural environment. In some embodiments, the isolated strain or isolate is a biologically pure culture of a specific strain of bacteria. As used herein, "biologically pure" refers to a culture that is substantially free of other organisms.

As used herein, "biosurfactant" refers to compounds that are produced at the bacterial cell surface and/or secreted from the bacterial cell and function to reduce surface tension and/or interfacial tension. Non-limiting examples of biosurfactants include: lipopeptides, surfactin, glycolipids, rhamnolipids, methyl rhamnolipids, viscosin, and the like. The isolated strain may be capable of producing one or more types of biosurfactant.

In some embodiments, the isolated strain may produce one or more additional active compounds. For example, the isolated strain may produce a biopolymer, solvent, acid, exopolysaccharide, and the like.

In some embodiments, the at least one isolated strain of bacteria comprises a strain of *Bacillus*. In other embodiments, the at least one isolated strain comprises a strain of bacteria capable of biosurfactant production and that is non-pathogenic. Non-limiting examples of suitable strains are listed in Satpute et al. "Methods for investigating biosurfactants and bioemulsifers: a review" *Critical Reviews in Biotechnology,* 2010, 1-18. For example, the at least one isolated strain of *Bacillus* may be *Bacillus amyloliquefaciens, Bacillus licheniformis, Bacillus pumilus, Bacillus subtilis,* or combinations thereof, and in particular *Bacillus licheniformis.*

In some embodiments, the pH of the composition may be selected or adjusted to provide a suitable pH for the isolated strain(s). In some embodiments, the composition may further comprise one or more nutrients to support growth of the bacteria such as, for example, acetate, one or more vitamins, and the like.

In some embodiments, the isolated strain is in a viable form. For example, in some embodiments, the isolated strain may be in the form of a liquid suspension. In some embodiments, the isolated strain may be incubated for a suitable period of time prior to incorporation into the composition such that at least a portion of biosurfactant(s) are secreted into the bacterial suspension and therefore can be incorporated into the composition. For example, the bacteria can be incubated/fermented for between about one day and about six months or longer. The isolated strain may be incubated in the presence of a nutrient source and under suitable conditions (e.g. temperature, agitation, etc.) to produce the biosurfactant(s).

In other embodiments, the isolated strain may be in a lyophilized (freeze-dried) form. In some embodiments, the freeze-dried form comprises freeze-dried spores.

In some embodiments, where the isolated strain is in the form of a liquid suspension or in a freeze-dried form, the composition may comprise approximately 40 billion CFU (colony forming units) may be combined with at least about 1 g of lignin and up to several tons of lignin.

In other embodiments, the isolated strain may in an inviable form. For example, the isolated strain may be in the form of heat-killed cells or a cell lysate. In these embodiments, the bacteria of the isolated strain may be incubated for a suitable period of time prior to loss of viability (e.g. heat killing or lysis) such that a sufficient quantity of biosurfactant(s) is/are secreted into the bacterial suspension for incorporation into the composition. For example, the bacteria may be incubated for at least one week prior to loss of viability.

In other embodiments, a liquid suspension of bacteria may be incubated to produce the biosurfactant(s) and a supernatant containing the biosurfactant(s) may be separated from the bacterial cells and used in the composition.

Without being limited by theory, it is believed that the combination of lignin and the biosurfactant produced by the isolated strain act to mimic the natural habitat of the biosurfactant producing strains. The lignin may function as a growth substrate that contains required nutrients (carbon and fructose) to support growth of the bacteria, with the exception of additional acetate and metallic vitamins which may be added to the composition as needed.

In addition, a series of drop collapse tests were conducted to evaluate additional benefits of combining the lignin with a suitable biosurfactant in the composition of the invention. In particular, the tests were carried out to determine the effectiveness of the compositions of the invention in reducing the surface tension of water and other liquids. The results indicated that a further advantage in combining the lignin and biosurfactant in the composition of the invention is a significant reduction in surface tension at concentrations of between about 10 ppm and 300 ppm of the biosurfactant, which assists significantly in the compositions ability to cut through hydrocarbon containing materials.

In some embodiments, live methanogens may also be introduced into contact with the hydrocarbons or reservoir, in which case the lignin/growth substrate may need to be deoxygenated. In some embodiments, deoxygenation may comprise introducing CO$_2$ and/or nitrogen into the lignin/ growth substrate. In some embodiments, the CO$_2$ and/or nitrogen is infused into the lignin via one or more nanobubble devices. In this embodiment, the aerobic bio-surfactant bacterial strains may be in the form of preserved freeze-dried spores to avoid introduction of additional oxygen.

In some embodiments, the lignin-based recovery compositions of the invention further comprise catholyte solutions. As used herein, "catholyte solution" is an activated solution produced in an electrochemical reaction, and is that part of the electrolyte solution adjacent the cathode of an electrochemical cell. It can be produced, for instance, from a 0.05%-1% salt brine (NaCl or KCl), and has a pH in the range 10.0 to 13.0 and an ORP/Redox value of less than about −800 mV, typically in the order of −900 to −950 mV. In the case of an NaCl starting solution, the active ingredient is highly active, and typically unstable, NaOH.

The recovery compositions of the invention can comprise from about 1% to about 75% by volume of the catholyte solution.

In some embodiments, the composition further comprises at least one of a carboxylic acid or a salt or ester thereof. In some embodiments, the carboxylic acid is a di-carboxylic acid or a salt or ester thereof. The carboxylic acid or salt/ester thereof may function as a solvent, for example, by facilitating formation of a stable emulsion of the various components of the composition. In some embodiments, the composition comprises a carboxylic acid ester. In some embodiments, the carboxylic acid ester comprises a methyl ester or a butyl ester. In some embodiments, the butyl esters are produced by biochemical metathesis. In some embodiments, the butyl ester comprises n-Butyl 4-oxopentanoate. In some embodiments, the methyl ester comprises unsaturated $C_{10}$ or $C_{12}$ methyl ester. In some embodiments, the methyl ester comprises methyl 9-decenoate or methyl 9-dodecenoate. In some embodiments, the methyl ester is produced from a plant oil feedstock.

In other embodiments the di-carboxylic acid or a salt or ester thereof may comprise at least one oleic acid or a salt or ester thereof. In some embodiments, the oleic acid or a salt or ester thereof may be provided in the form of "tall oil", a viscous liquid obtained as a byproduct of the Kraft process. In some embodiments, the tall oil may be distilled to tall oil rosin or tall oil fatty acid (TOFA) which comprise a higher proportion of oleic acids than tall oil.

In other embodiments, the carboxylic acid may comprise acetic acid and/or pyroligneous acid, as described in more detail below.

In some embodiments, the composition comprises a combination of two or more carboxylic acids or salts/esters thereof. As one example, the composition may comprise a combination of one or more of: di-carboxylic acid, pyroligneous acid, and butyl esters produced by biochemical metathesis.

In some embodiments, the composition may comprise about 1% to about 30%, or about 1% to about 20%, or about 1% to 10% of di-carboxylic acid and/or pyroligneous acid and/or butyl esters by volume.

In some embodiments, the composition further comprises pyroligneous acid. Pyroligneous acid is also known as wood vinegar or wood acid. The pyroligneous acid may be produced by fast pyrolysis, slow pyrolysis, or any other suitable process. The pyroligneous acid may be produced from any suitable biomass such as, for example, beech biomass. As one example, the pyroligneous acid may be supplied by Nettenergy™ (CAS number 8030-97-5). In some embodiments, the pyroligneous acid comprises about 2% to about 20% acetic acid, or about 5% to about 10% acetic acid, or about 7% acetic acid. In some embodiments, the pyroligneous acid comprises about 2% or above or about 5% or above, and/or about 20% or below or about 10% or below acetic acid. In other embodiments, an aqueous solution of pure or relatively pure acetic acid at the concentrations listed above may be used in place of the pyroligneous acid. The pyroligneous acid may function as a solvent to facilitate dissolution of the composition into the hydrocarbon-containing material in the methods described below. In some embodiments, the pyroligneous acid may also be used as a pretreatment in methods for recovering hydrocarbon from a subterranean reservoir, as described in more detail below. In some embodiments, the composition may comprise about 1% to about 50%, or about 10% to about 40%, or about 30% pyroligneous acid by volume. In some embodiments, the composition may comprise about 1% or above or about 10% or above pyroligneous acid by volume. In some embodiments, the composition may comprise about 50% or less or about 40% or less pyroligneous acid by volume.

In some embodiments, the composition further comprises carbon black. The carbon black may be electroconductive carbon black and the carbon black may function to increase the conductivity of the composition. In some embodiments, the carbon black may be conductive, superconductive, extra-conductive or ultraconductive carbon black. In some embodiments, the carbon black may be in the form of carbon black beads, microparticles, and/or nanoparticles. For example, the carbon black may comprise Printex™ XE2 B Beads from Orion Engineered Carbons™. In some embodiments, the composition may comprise about 0.5% to about 10% carbon black by volume. In some embodiments, addition of carbon black may increase the negative zeta potential of the composition thereby increasing its electrical stability. In other embodiments, the composition may comprise any other highly conductive microparticle and/or nanoparticle.

Optionally, the composition may further comprise pyrolysis oil. Pyrolysis oil may also be referred to as wood oil. The pyrolysis oil may be produced by fast pyrolysis, slow pyrolysis, or any other suitable process. The pyrolysis oil may be produced from any suitable biomass such as, for example, beech biomass. The pyrolysis oil may act as an odorant to mask the smell of the lignin in the composition. The composition may comprise about 0.1% to about 2%, or about 0.2% to about 1%, or about 0.5% pyrolysis oil by weight. The composition may comprise about 0.1% or above about 0.2% or above pyrolysis oil by weight. The composition may comprise about 2% or less or about 1% or less pyrolysis oil by weight.

In some embodiments, the composition is gasified with a gas. As used herein, "gasified" refers to introduction of a gas into the composition such that bubbles of the gas are suspended therein. The term "aerated" refers to gasifying with air or oxygen. The gas may be selected based on the aerobic or anaerobic nature of the isolated strain(s) incorporated into the composition. In some embodiments, the gas at least partially comprises oxygen. For example, the gas may be air or relatively pure oxygen. In some embodiments, the gas may at least partially comprise carbon dioxide and/or nitrogen. Gasification may function to provide oxygen and/or other suitable gasses directly or in close proximity to the bacterial cells of the isolated strain. Gasification may promote proliferation of the bacterial cells and allow the composition to be used or stored for an extended period of time. In some embodiments, the aerated composition may have a half-life of about 20 to 30 days.

In some embodiments, the composition is gasified with nanobubbles and/or microbubbles of the gas. As used herein, "nanobubble" refers to bubbles in the nanometer range and "microbubble" refers to bubbles in the micrometer range. The nanobubbles and/or microbubbles may be introduced into the composition by any suitable means including, for example, a micro- or nanobubble nozzle or a venturi tube.

It has surprisingly been found that using a stabilized or upgraded as opposed to an otherwise unstable catholyte solution enhances the action of the compositions of the invention. Accordingly, in some embodiments, the catholyte solution is pre-treated in a system that is designed to introduce nitrogen gas into the catholyte solution, in particular in the form of nano- and/or micro-bubbles, for incorporation into a composition of the invention.

Accordingly, in some embodiments, the catholyte solution is upgraded prior to blending with the other components of the recovery composition.

In some embodiments, the composition may comprise any other suitable components. For example, in some embodiments, the composition may further comprise at least one nutrient source for the live bacteria of the isolated strain.

Therefore, in some embodiments, a relatively non-toxic, inert, and sustainable composition is provided for hydrocarbon recovery. The composition may also be relatively low cost as lignin is a waste product of pulp and paper operations that is typically discarded.

FIG. 1 shows an example system 100, according to some embodiments, that may implement one or more embodiments of the oil recovery methods described herein. The example system 100 may comprise at least one injection well 104 and at least one production well 106. The injection and production wells 104 and 106 may be installed in a subterranean reservoir 102, in an earth formation 101, having a pay interval 103.

In this embodiment, the injection well 104 and the production well 106 are vertical wells, horizontally spaced from one another. In other embodiments, one or both of the injection and production well 104 and 106 may be horizontal wells. In other embodiments, a single well (not shown) may function as both the injection and production well. In some embodiments, the reservoir 102 may comprise a plurality of pay intervals 103 and at least one injection well 104 and production well 106 may be installed in each pay interval 103.

The injection well 104 and the production well 106 may be in fluid communication via the reservoir 102. An injection fluid may be injected via the injection well 104 and flow into the reservoir 102. Mobilized oil in the reservoir 102, along with at least a portion of the injection fluid, may flow to the production well 106. Production fluid may be produced to surface via the production well 106. In some embodiments, a pumpjack (not shown) may be situated at the surface to mechanically lift the production fluid to surface.

In some embodiments, the production fluid produced from the production well 106 may be received at a separation facility 108. At the separation facility 108, the recovered injection fluid may be separated from the oil in the production fluid. In some embodiments, the injection fluid may be treated to remove residual contaminants such that at least a portion of the injection fluid may be recycled and used for further injection. In some embodiments, the recycled injection fluid is received into a storage facility 110 where it may be combined with make-up injection fluid. Although the separation and storage facilities 108 and 110 are shown separately in FIG. 1, it will be understood that they can also be combined in a single surface facility.

Optionally, the system 100 may further comprise at least one heating system (not shown) to heat the injection fluid.

The heating system may be used when the EOR method involves a thermal injection method, such as steam flooding for example.

FIG. 2 is a flowchart of an example method 200 for recovering hydrocarbon from a subterranean reservoir. The method 200 may be implemented using the system 100 of FIG. 1.

At block 202, an injection fluid comprising lignin and at least one isolated strain of bacteria capable of biosurfactant production is injected via the injection well 104. The injection fluid may comprise any embodiment of the composition described above.

In some embodiments, the injection fluid may further comprise a carrier fluid. The carrier fluid may comprise water, a polymer solution, one or more solvents, etc. In some embodiments, the carrier fluid may comprise any of the injection fluids used in EOR methods. In some embodiments, the carrier fluid is a catholyte solution.

The composition may be injected at any suitable temperature. In some embodiments, the composition is injected at ambient temperatures without the application of additional heat. In other embodiments, the composition may be heated, for example, to a temperature of between about 1° C. and about 200° C.

In some embodiments, the injection fluid may be injected for a suitable injection period prior to the steps at block 204 as described below. The injection period may allow the injection fluid to permeate into the pay interval 103 and begin to mobilize the hydrocarbons therein to flow towards the production well 106. The injection period may be, for example, between about 1 to about 96 hours. In other embodiments, the steps at block 204 may be performed immediately following, or simultaneous to, the steps at block 202.

At block 204, at least a portion of the hydrocarbon is recovered via the production well 106. The hydrocarbon may be recovered as part of the production fluid flowing to the production well 106. In some embodiments, the hydrocarbon is recovered by pumping the production fluid via the pumpjack. The production fluid may also contain at least a portion of the injection fluid.

In some embodiments, the method 200 may further comprise recycling at least a portion of the injection fluid. For example, at least a portion of the lignin and any remaining viable bacteria may be separated from the production fluid at the separation facility 108. Similarly, it may be possible to recover at least a portion of the carboxylic acid, pyroligneous acid, carbon black, etc. of the composition. In embodiments in which a carrier is used, at least a portion of the carrier may also be separated from the production fluid. The recycled injection fluid (or components thereof) may be stored in a storage facility and combined with make-up injection fluid for re-injection via the injection well 104.

In some embodiments, the method 200 may be performed approximately continuously, with approximately continuous injection of the injection fluid and recovery of hydrocarbons from the reservoir 102, although occasional interruptions may be required, for example, for maintenance or emergency purposes.

In other embodiments, the method 200 may be alternated with one or more other EOR methods or primary/secondary recovery methods. As one example, the method 200 may be alternated with polymer flooding such that injection of the injection fluid described above is alternated with injection of a polymer solution. In EOR methods involving thermal injection (e.g. steam flooding, SAGD, CSS, etc.), thermal injection may be suspended for a suitable period of time prior to performing the method 200 to avoid heat-killing the bacteria of the injection fluid.

In other embodiments, the method 200 may be used as a pre-treatment and/or a post-treatment for one or more other EOR methods or primary/secondary recovery methods. As one example, the method 200 may be used as a pre-treatment to precondition a viscous oil reservoir prior to initiating SAGD operations.

FIG. 3 is a flowchart of another example method 300 for recovering hydrocarbons from a subterranean reservoir. The method 300 may be implemented using the system 100 of FIG. 1.

At block 302, a pre-treatment injection fluid comprising pyroligneous acid is injected via the injection well. In some embodiments, the pre-treatment injection fluid comprises about 50% or greater, about 60% or greater, about 70% or greater, or about 80% or greater pyroligneous acid by volume. In some embodiments, the remainder of the pre-treatment injection fluid may comprise the composition disclosed herein, including lignin, at least one isolated strain of bacteria capable of biosurfactant production, optionally a catholyte solution, and at least one methanogen species. In other embodiments, the remainder of the pre-treatment injection fluid may comprise water, catholyte solution, or another suitable solvent.

The pre-treatment injection fluid may be injected at any suitable temperature. In some embodiments, the pre-treatment injection fluid is injected at ambient temperatures without the application of additional heat. In other embodiments, the pre-treatment injection fluid may be heated, for example, to a temperature of between about 1° C. and about 200° C.

The pre-treatment injection fluid may be injected for a suitable pre-treatment period. In some embodiments, the pre-treatment period may be between about thirty to about ninety days. In other embodiments, the pre-treatment period may be any suitable period of time.

At block 304, an injection fluid comprising lignin and at least one isolated strain of bacteria capable of biosurfactant production is injected via the injection well 104. The steps at block 304 may be similar to those at block 202 as described above.

At block 306, at least a portion of the hydrocarbon is recovered via the production well. The steps at block 306 may be similar to those at block 204 as described above.

The pyroligneous acid in the pre-treatment injection fluid may act as a solvent to dissolve into the hydrocarbons in the reservoir 102. The pre-treatment injection fluid may thereby allow the subsequent injection fluid to penetrate deeper into the reservoir.

Various modifications besides those already described are possible without departing from the concepts disclosed herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof.

The invention claimed is:

1. A method for recovering hydrocarbons from a hydrocarbon source, the method comprising:
   a) providing a hydrocarbon recovery composition comprising i) lignin and ii) at least one isolated strain of bacteria capable of producing at least one biosurfactant and/or at least one biosurfactant produced from the at least one bacteria, wherein the lignin comprises lignin particles, wherein at least 20% of the lignin particles are lignin nanoparticles, and wherein the composition has a solids content of about 50% or above;
   b) contacting the hydrocarbon source with the composition; and
   c) recovering at least a portion of the contacted hydrocarbons.

2. The method of claim 1, wherein the method is for enhanced oil recovery (EOR).

3. The method of claim 1, wherein the lignin comprises at least one of lignin nanoparticles and lignin microparticles.

4. The method of claim 1, wherein the composition further comprises a catholyte solution.

5. The method of claim 4, wherein the catholyte solution is a stabilized or enhanced catholyte solution.

6. A method for recovering hydrocarbons from a hydrocarbon source, the method comprising:
   a) injecting a pre-treatment fluid comprising at least 50% pyroligneous acid into the hydrocarbon source;
   b) contacting the hydrocarbon source with a hydrocarbon recovery composition comprising i) lignin and ii) at least one isolated strain of bacteria capable of producing at least one biosurfactant and/or at least one biosurfactant produced from the at least one bacteria, wherein the composition has a solids content of about 50% or above; and
   c) recovering at least a portion of the contacted hydrocarbons.

7. The method of claim 6, wherein the hydrocarbon source is a subterranean reservoir comprising an injection well and a production well installed therein, wherein the method comprises injecting the composition into the injection well of the subterranean reservoir and recovering at least a portion of the hydrocarbons from the production well.

8. The method of claim 6, wherein the method is for enhanced oil recovery (EOR).

9. The method of claim 6, wherein the lignin comprises at least one of lignin nanoparticles and lignin microparticles.

10. The method of claim 6, wherein the lignin comprises lignin particles, wherein at least 20% of the lignin particles are lignin nanoparticles.

11. The method of claim 6, wherein the composition further comprises a catholyte solution.

12. The method of claim 11, wherein the catholyte solution is a stabilized or enhanced catholyte solution.

\* \* \* \* \*